(12) United States Patent
Yamane et al.

(10) Patent No.: US 11,241,864 B2
(45) Date of Patent: Feb. 8, 2022

(54) INSULATOR

(71) Applicant: KEYLEX CORPORATION, Hiroshima (JP)

(72) Inventors: Toshimasa Yamane, Hiroshima (JP); Kazunari Uehara, Hiroshima (JP)

(73) Assignee: KEYLEX CORPORATION, Hiroshima (JP)

( * ) Notice: Subject to any disclaimer, the term of this patent is extended or adjusted under 35 U.S.C. 154(b) by 300 days.

(21) Appl. No.: 16/349,921

(22) PCT Filed: Jun. 21, 2017

(86) PCT No.: PCT/JP2017/022921
§ 371 (c)(1),
(2) Date: Jul. 19, 2019

(87) PCT Pub. No.: WO2018/092344
PCT Pub. Date: May 24, 2018

(65) Prior Publication Data
US 2020/0207062 A1 Jul. 2, 2020

(30) Foreign Application Priority Data
Nov. 15, 2016 (JP) .............................. JP2016-222774

(51) Int. Cl.
*B60R 13/08* (2006.01)
*B32B 15/20* (2006.01)
(Continued)

(52) U.S. Cl.
CPC ................ *B32B 15/20* (2013.01); *B32B 3/30* (2013.01); *B32B 15/04* (2013.01); *B60R 13/08* (2013.01);
(Continued)

(58) Field of Classification Search
CPC ....................................................... B60R 13/08
See application file for complete search history.

(56) References Cited

U.S. PATENT DOCUMENTS

2006/0124384 A1    6/2006  Berbner et al.
2011/0200816 A1*   8/2011  Mizrahi ................. B32B 27/40
                                              428/328
(Continued)

FOREIGN PATENT DOCUMENTS

JP    H07-267017 A    10/1995
JP    H10-251712 A     9/1998
(Continued)

OTHER PUBLICATIONS

European Aluminum Automotive Association, "The Aluminum Automotive Manual: EAA Aluminum Automotive Manual—Joining 7. Solid state welding", 2015, p. 1-31.*
(Continued)

*Primary Examiner* — Mark Ruthkosky
*Assistant Examiner* — Julia L Rummel
(74) *Attorney, Agent, or Firm* — Alston & Bird LLP

(57) ABSTRACT

According to the present invention, a panel-shaped first metal body (2) comprises a space-forming part (2a) and an overlap part (2b) that is continuous with the space-forming part (2a). A panel-shaped second metal body (4) comprises a space-forming part (4a) and an overlap part (4b) that is continuous with space-forming part (4a). When the first metal body (2) and the second metal body (4) have been assembled, a housing space layer (S1) that is for housing a sheet-shaped glass wool material 3 is formed between the space-forming parts (2a, 4a), and the overlap parts (2b, 4b) overlap. A solid joining part (W1) that connects the overlap parts (2b, 4b) is formed between the overlap parts (2b, 4b).

4 Claims, 2 Drawing Sheets

(51) Int. Cl.
*B32B 3/30* (2006.01)
*B32B 15/04* (2006.01)
(52) U.S. Cl.
CPC ... *B32B 2262/101* (2013.01); *B32B 2307/102* (2013.01); *B32B 2307/304* (2013.01)

(56) References Cited

U.S. PATENT DOCUMENTS

2014/0120364 A1* 5/2014 Peca .................... B23K 31/02
   428/614
2015/0270238 A1 9/2015 Oshima et al.
2015/0298443 A1* 10/2015 Hundley ................ B32B 27/06
   156/214

FOREIGN PATENT DOCUMENTS

| | | |
|---|---|---|
| JP | 2002-105567 A | 4/2002 |
| JP | 2006-519710 A | 8/2006 |
| JP | 2007-065319 A | 3/2007 |
| JP | 2014-031751 A | 2/2014 |
| JP | 2015-170834 A | 9/2015 |
| JP | 2015-185612 A | 10/2015 |

OTHER PUBLICATIONS

International Searching Authority, International Search Report and Written Opinion for International Application No. PCT/JP2017/022921, dated Aug. 1, 2017, 9 pages, Japanese Patent Office, Japan.

* cited by examiner

INSULATOR

CROSS REFERENCE TO RELATED APPLICATIONS

This application is a national stage continuing application, filed under 35 U.S.C. § 371, of International Application No. PCT/JP2017/022921, filed Jun. 21, 2017, which International Application claims priority to Japanese Application No. 2016-222774, filed Nov. 15, 2016; the contents of both of which as are hereby incorporated by reference in their entirety.

BACKGROUND

Related Field

The present disclosure relates to an insulator for heat shielding and sound absorption, which is assembled in a vehicle, for example.

Description of Related Art

A known insulator, for example the one disclosed in Japanese Unexamined Patent Publication No. 2006-519710, is disposed between a lower surface of a floor pan at a lower part of a vehicle and a muffler for the purpose of sound absorption and heat shielding. The above insulator includes a panel-like first metal body made of an aluminum alloy material, a sheet-like sound absorbing and sound absorbing body disposed on the floor pan side of the first metal body, and a film-like second metal body made of an aluminum alloy material disposed on the floor pan side of the sound absorbing and heat shielding body. The first metal body is provided with a plurality of communication holes communicating with a space receiving the sound absorbing and heat shielding body between the first metal body and the second metal body. In addition, the insulator is configured to absorb noise entering the space between the first and second metal bodies through each of the communication holes by using the sound absorbing and heat shielding body. Further, the heat shielding is performed by using the first and second metal bodies made of an aluminum alloy material having a high reflectance, so that the sound absorbing effect as well as the heat shielding effect are enhanced at the same time.

BRIEF SUMMARY

In the insulator of Japanese Unexamined Patent Publication No. 2006-519710, the outer circumference of the first metal body is folded and this folding portion sandwiches the outer circumference of the sound absorbing and heat shielding body as well as the outer circumference of the second metal body. As a result, the first metal body, the sound absorbing and heat shielding body and the second metal body are formed integrally. Accordingly, the material yield decreases because of the folding portion of the first metal body. Moreover, the weight of the insulator after completion increases.

In order to avoid this problem, it may be conceivable to form the first metal body and the second metal body integrally with each other through welding of the outer circumference of the first metal body and the outer circumference of the second metal body.

However, the first and the second metal bodies constituting the insulator of, for example, Japanese Unexamined Patent Publication No. 2006-519710 are commonly made of metal plates with a plate thickness of equal to or less than 1 mm so as to avoid the increase in vehicle weight. Therefore, in case where the outer circumference of the first metal body and the outer circumference of the second metal body are connected with each other through welding, the first and the second metal bodies may be thermally deformed due to heat generated during welding, which may result in deterioration of appearance accuracy of the finalized insulator.

The present disclosure is made in view of the above background and has an object to provide an insulator which is lightweight and has good material yield and excellent appearance accuracy.

In order to achieve the above object, according to the present disclosure, the first and second metal bodies are formed integrally through solid phase welding using ultrasonic wave.

A first aspect of the present disclosure is directed to an insulator. The insulator includes: a first metal body formed into a panel shape; a sound absorbing and heat shielding body formed into a sheet shape and disposed over a panel surface of the first metal body; and a second metal body formed into a panel shape and assembled to the first metal body to cover the sound absorbing and heat shielding body, wherein the first metal body and the second metal body each include a space forming portion and an overlapping portion, the space forming portions forming an accommodation space layer receiving the sound absorbing and heat shielding body between panel surfaces of the first metal body and the second metal body with the second metal body assembled to the first metal body, each of the overlapping portions being formed continuously to the corresponding one of the space forming portions and overlapping a facing one of the panel surfaces of the first metal body and the second metal body, and a solid phase welding portion connecting the overlapping portion of the first metal body with the overlapping portion of the second metal body are formed between the overlapping portion of the first metal body and the overlapping portion of the second metal body.

In a second aspect according to the first aspect, the solid phase welding portion includes a plurality of sold phase welding portions formed intermittently along outer circumference of the first and the second metal bodies.

In a third aspect according to the first aspect or the second aspect, the first and the second metal bodies are made of an aluminum alloy material.

According to the first aspect of the present disclosure, there is no need to provide a folding portion on the outer circumference of the metal body at the time of manufacturing of the insulator, which is not the case with Japanese Unexamined Patent Publication No. 2006-519710. Therefore, it is possible to obtain good material yield and reduce the weight of the finalized insulator. Further, since the overlapping portion of the first metal body and the overlapping portion of the second metal body are connected with each other through the solid phase welding portions. Therefore, it is possible to reduce the amount of heat applied to the first and the second metal bodies at the time of welding. Accordingly, it is possible to improve the appearance accuracy of the insulator after completion.

According to the second aspect of the present disclosure, areas of the outer circumferences of the first and the second metal bodies where no solid phase welding portions exist appear intermittently along the outer circumferences of the first and the second metal bodies. Therefore, this ensures to form the first and the second metal bodies integrally while reducing the amount of heat applied to the outer circumferences of the first and the second metal bodies.

According to the third and fourth aspect of the present disclosure, it is possible to provide an insulator which is lightweight and has a high heat shielding property.

DETAILED DESCRIPTION OF VARIOUS EMBODIMENTS

Embodiments of the present disclosure will now be described in detail with reference to the drawings. Note that the following description of embodiments is merely illustrative in nature.

Figure 1:
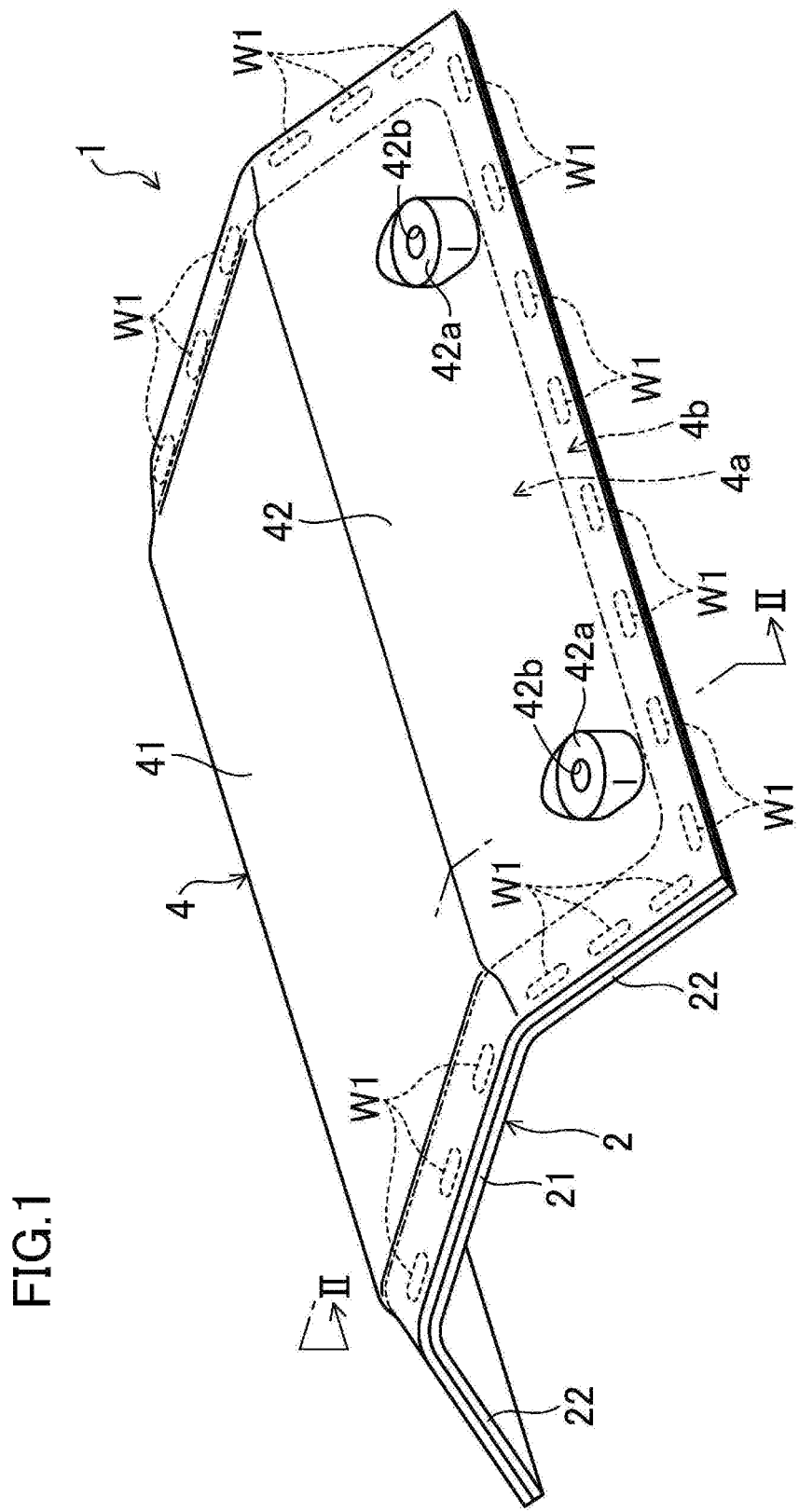
FIG. 1 is a perspective view of the insulator according to one embodiment of the present disclosure.
Figure 2:
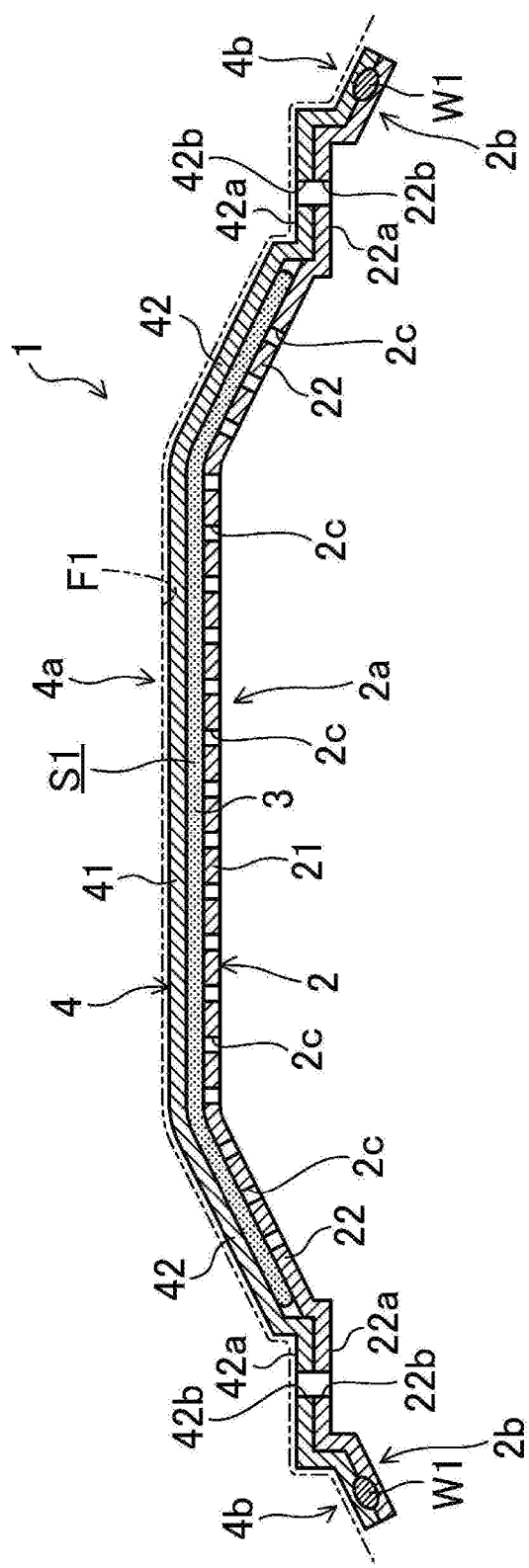
FIG. 2 is a cross-sectional view taken along line II-II of FIG. 1.

FIG. 1 and FIG. 2 show an insulator 1 according to an embodiment of the present disclosure. The insulator 1 is mounted on a lower surface of a floor pan F1 of a vehicle for the purpose of heat shielding and sound insulation against heat, noise, and the like generated from exhaust system components and driving system components.

The insulator 1 includes a first metal body 2 made of a panel-like aluminum alloy material extending in the vehicle longitudinal direction, a sheet-like glass wool material 3 (sound absorbing and heat shielding body) disposed over a panel surface on the floor pan F1 side of a first metal body 2, and a second metal body 4 made of a panel-like aluminum alloy material provided on the floor pan F1 side of the glass wool material 3. The second metal body 4 is assembled to the first metal body 2 so as to cover the glass wool material 3. Note that, for convenience, the plate thicknesses of the first and second metal bodies 2,4 shown in FIG. 1 and FIG. 2 are exaggerated.

The first metal body 2 is obtained through press-molding of an aluminum-alloy plate of a plate thickness of 0.4 mm to 0.6 mm and in the 1000s to 3000s. The first metal body 2 has a horizontal surface portion 21 extending in the vehicle longitudinal direction and a pair of inclining surface portions 22 inclined gradually downward from the either side of the horizontal surface portion 21 in the vehicle width direction toward the either end thereof in the vehicle width direction.

Each of the above inclining surface portions 22 is provided with a pair of first seat surface portions 22a. The first seat surface portions 22a are arranged at predetermined intervals in the vehicle longitudinal direction. Each first seat portion 22a has a circular form in a plan view, protrudes upward, and extends horizontally. A first fitting hole 22b is formed in the middle of each of the first seat surface portions 22a to pass through each of the pair of the first seat surface portions 22a.

An overlapping portion 2b which overlaps the second metal body 4 when the second metal body 4 is assembled to the first metal body 2 is provided at an area, of the first metal body 2, which is located outside of the four first seat surface portions 22a.

In addition, a space forming portion 2a which is continuous with the overlapping portion 2b is provided at an area, of the first metal body 2, which is surrounded by the four first seat surface portions 22a. A large number of through holes 2c are formed in the space forming portion 2a.

The second metal body 4 is obtained through press-molding of an aluminum alloy plate of a plate thickness of 0.4 mm to 0.6 mm and in the 1000s to 3000s. The second metal body 4 is provided with a horizontal panel portion 41 extending in the vehicle longitudinal direction and a pair of inclining panel portions 42 inclined gradually downward from the either side of the horizontal panel portion 41 in the vehicle width direction toward the either end in the vehicle width direction.

Each of the above inclining surface portions 42 is provided with a pair of second seat surface portions 42a. The second seat surface portions 22a have a circular form in a plan view, protrude upward and extend horizontally, so that each of the second seat surface portions 22a corresponds to one of the first seat surface portions 22a of the first metal body 2. A second fitting hole 42b is formed in the middle of each of the second seat surface portions 42a so as to pass therethrough.

A overlapping portion 4b which overlaps the overlapping portion 2b when the second metal body 4 is assembled to the first metal body 2 is provided at an area, of the second metal body 4, which is located outside of the four second seat surface portions 42a, so as to form a space forming portion 4a extending stepwise and upward from the overlapping portion 4b.

When the second metal body 4 is assembled to the first metal body 2, the panel surface of the overlapping portion 2b of the first metal body 2 overlaps the panel surface of the overlapping portion 4b of the second metal body 4. Further, an accommodation space layer S1 receiving the glass wool material 3 is formed between the panel surface of the space forming portion 2a of the second metal body 2 and the panel surface of the space forming portion 4a of the second metal body 4.

A plurality of solid phase welding portions W1 obtained through ultrasonic welding are formed intermittently along the outer circumferences of the first and the second metal bodies 2,4 between the overlapping portion 2b of the first metal body 1 and the overlapping portion 4b of the second metal body 4 to connect the overlapping portion 2b of the first metal body 2 with the overlapping portion 4b of the second metal body 4. As a result, the first metal body 2 and the second metal body 4 are formed integrally with each other through the solid phase welding portions W1.

As described above, according to the embodiment of the present disclosure, there is no need to provide a folding portion on the outer circumference of the first metal body at the time of manufacturing the insulator 1, which is not the case with the disclosure of Japanese Unexamined Patent Publication No. 2006-519710. As a result, the material yield can be improved and the weight of the insulator 1 after completion can be reduced. The overlapping portion 2b of the first metal body 2 and the overlapping portion 4b of the second metal body 4 are connected with each other through the solid phase welding portions W1. Therefore, it is possible to reduce the amount of heat applied to the first and the second metal bodies 2,4 at the time of welding. Accordingly, it is possible to improve the appearance accuracy of the finished insulator 1.

Two or more of the solid phase welding portions W1 are formed intermittently along the outer circumferences of the first and the second metal bodies 2,4. Therefore, areas where no solid phase welding portions W1 exist appear intermittently along the outer circumferences of the first and the second metal bodies 2,4. Accordingly, it is possible to reliably integrate the first and second metal bodies 2,4 while reducing the amount of heat applied to the outer circumferences of the first and second metal bodies 2,4, thereby making it possible to minimize the thermal deformation of the first and second metal bodies 2,4.

Since the first and second metal bodies 2,4 are made of an aluminum alloy material, the insulator 1 can be lightweight and have high heat shielding property.

In the embodiments of the present disclosure, the outer circumferences of the first and the second metal bodies 2,4 overlap each other, and the overlapped areas thereof are connected through the solid phase welding portions W1. The areas of the first and the second metal bodies 2,4 which serves as portions for connecting the first and the second metal bodies through the solid phase welding portions W1, may not be the outer circumference of the first and the second metal bodies 2,4, but can be areas located inside of the first and the second metal bodies 2,4.

Further, in the embodiment of the present disclosure, the space forming portion 4a of the second metal body 4 protrudes stepwise and upward from the overlapping portion 4b so that an accommodation space layer S1 is formed between the space forming portion 4a of the second metal body 4 and the space forming portion 2a of the first metal body 2. However, the present disclosure is not limited thereto. For example, the arrangement is also possible in which the space forming portion 4a of the second metal body 4 does not protrude upward from the overlapping portion 4b and the space forming portion 2a of the first metal body 2 protrudes stepwise and downward so that the accommodation space layer S1 is formed between the space forming portion 4a of the second metal body 4 and the space forming portion 2a of the first metal body 2.

According to the embodiments of the present disclosure, the first and the second metal bodies 2,4 are made of aluminum an alloy material, but they may also be made of other materials.

According to the embodiments of the present disclosure, the accommodation space layer S1 receives the glass wool material 3 as a sound absorbing and heat shielding body. However, other sound absorbing heat shield bodies may also be received.

The present disclosure is suitable for an insulator for heat shielding and sound absorption, which is assembled in a vehicle, for example.

What is claimed is:

1. An insulator configured for mounting on a vehicle, the insulator comprising:
    a first metal body formed into a panel shape;
    a sound absorbing and heat shielding body formed into a sheet shape and disposed over a panel surface of the first metal body; and
    a second metal body formed into a panel shape and assembled to the first metal body to cover the sound absorbing and heat shielding body,
    wherein:
        the first metal body and the second metal body each include a space forming portion and an overlapping portion, the space forming portions forming an accommodation space layer receiving the sound absorbing and heat shielding body between panel surfaces of the first metal body and the second metal body with the second metal body assembled to the first metal body, each of the overlapping portions being formed continuously to the corresponding one of the space forming portions and overlapping a facing one of the panel surfaces of the first metal body and the second metal body,
        a solid phase welding portion connecting the overlapping portion of the first metal body with the overlapping portion of the second metal body is formed between the overlapping portion of the first metal body and the overlapping portion of the second metal body,
        the first metal body includes a horizontal surface portion extending in a vehicle longitudinal direction and a pair of inclining surface portions inclined gradually downward from either side of the horizontal surface portion in a vehicle width direction toward either end of the first metal body in the vehicle width direction,
        each of the inclining surface portions of the first metal body is provided with a first seat surface portion, the first seat surface portion protruding upward and having a circular form in a plan view,
        the overlapping portion of the first metal body is located outside of the first seat surface portion in the inclining surface portion of the first metal body,
        the second metal body includes a horizontal surface portion extending in the vehicle longitudinal direction and a pair of inclining surface portions inclined gradually downward from either side of the horizontal surface portion in the vehicle width direction toward either end of the second metal body in the vehicle width direction,
        each of the inclining surface portions of the second metal body is provided with a second seat surface portion, the second seat surface portion protruding upward and having a circular form in a plan view,
        the second seat surface portion is provided at a position different from a position where the overlapping portion is located, the second seat surface portion being provided so as to overlap with the first seat surface portion, and
        the overlapping portion of the second metal body is located outside of the second seat surface portion in the inclining surface portion of the second metal body.

2. The insulator of claim 1, wherein:
the solid phase welding portion includes a plurality of sold phase welding portions formed intermittently along outer circumference of the first and the second metal bodies.

3. The insulator of claim 1, wherein:
the first and the second metal bodies are made of an aluminum alloy material.

4. The insulator of claim 2, wherein:
the first and the second metal bodies are made of an aluminum alloy material.

* * * * *